(12) United States Patent
Hwang et al.

(10) Patent No.: US 8,258,758 B2
(45) Date of Patent: Sep. 4, 2012

(54) SYSTEM TO IMPROVE A MULTISTAGE CHARGE PUMP AND ASSOCIATED METHODS

(75) Inventors: Charlie C. Hwang, Hopewell Junction, NY (US); Paul D. Muench, Poughkeepsie, NY (US); Donald W. Plass, Poughkeepsie, NY (US); Michael Sperling, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 12/166,192

(22) Filed: Jul. 1, 2008

(65) Prior Publication Data

US 2010/0001696 A1 Jan. 7, 2010

(51) Int. Cl.
*H02J 7/00* (2006.01)
(52) U.S. Cl. .................... 320/166; 307/109; 307/110
(58) Field of Classification Search .................. 320/166; 307/109, 110
See application file for complete search history.

(56) References Cited

U.S. PATENT DOCUMENTS

| | | | |
|---|---|---|---|
| 5,394,027 A * | 2/1995 | Park | 327/536 |
| 6,184,594 B1 * | 2/2001 | Kushnarenko | 307/109 |
| 6,226,194 B1 * | 5/2001 | Bayer et al. | 363/60 |
| 7,256,640 B2 | 8/2007 | Ucciardello et al. | 327/536 |
| 7,301,380 B2 * | 11/2007 | Masenas | 327/158 |

OTHER PUBLICATIONS

Ming-Dou Ker et al., Design of Charge Pump Circuit With Consideration of Gate-Oxide Reliability in Low-Voltage CMOS Processes, IEEE Journal of Solid-State Circuits, vol. 41, No. 5, pp. 1100-1107 (May 2006).
Jun Pan et al, A Charge Pump Circuit Without Overstress in Low-Voltage CMOS Standard Process, IEEE 1-4244-0637-4/07, pp. 501-504 (2007).

* cited by examiner

*Primary Examiner* — Huy Q Phan
*Assistant Examiner* — Temilade S Rhodes-Vivour
(74) *Attorney, Agent, or Firm* — William A. Kinnaman, Jr.

(57) ABSTRACT

A system to improve a multistage charge pump may include a capacitor, a first plate carried by the capacitor, and a second plate carried by the capacitor opposite the first plate. The system may also include a clock to control charging and discharging of the capacitor. The system may further include a power supply to provide a power supply voltage across the first plate and the second plate during charging of the capacitor. The system may also include a voltage line to lift the second plate to an intermediate voltage during discharging of the capacitor. The system may further include an output line connected to the first plate during discharging of the capacitor to provide an output voltage.

12 Claims, 7 Drawing Sheets

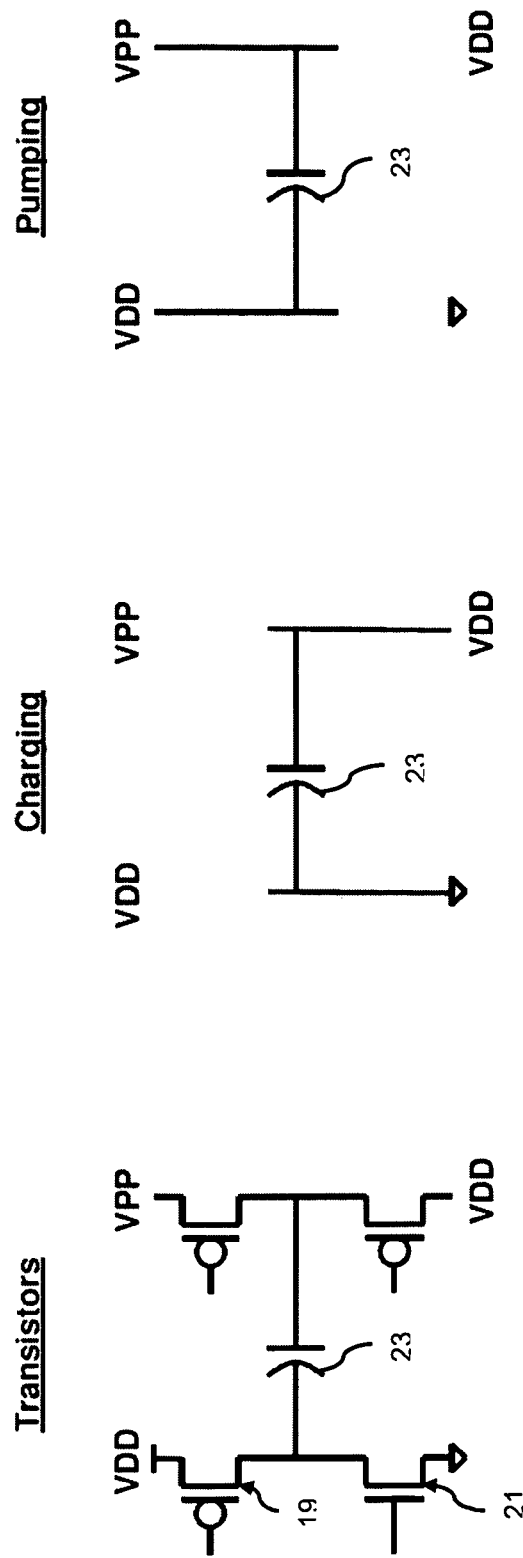

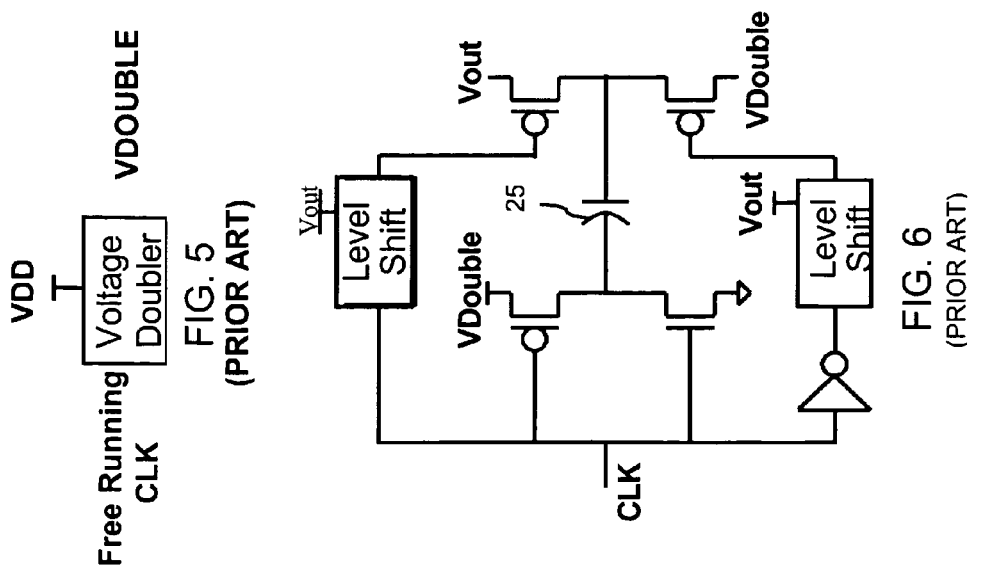

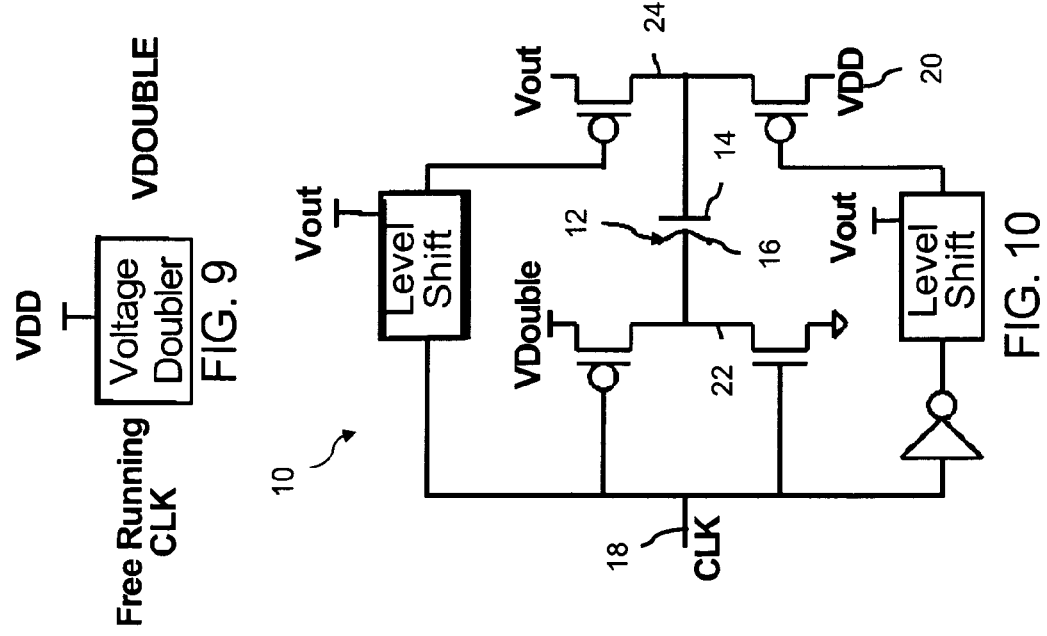

SYSTEM TO IMPROVE A MULTISTAGE CHARGE PUMP AND ASSOCIATED METHODS

FIELD OF THE INVENTION

The invention relates to the field of charge pumps, and, more particularly, to charge pump voltage generators.

RELATED APPLICATIONS

This application contains subject matter related to the following co-pending application entitled "System to Improve a Voltage Multiplier and Associated Methods" and having an attorney docket number of POU920080083US1, the entire subject matter of which is incorporated herein by reference in its entirety. The aforementioned application is assigned to the same assignee as this application, International Business Machines Corporation of Armonk, N.Y.

BACKGROUND OF THE INVENTION

A charge pump is an electrical circuit that can take in a direct current ("DC") voltage and generate an output voltage that is higher than the original. An alternate configuration is a negative charge pump which generates a voltage that can be below ground.

A prior art embedded dynamic random access ("eDRAM") memory cell is illustrated in FIG. 1. During a write to this memory cell, a high voltage is put on the 'Gate' and the voltage on the 'Node' 11 gets stored by the capacitor 13. The higher the voltage, the faster the capacitor will be charged. A charge pump can be used to generate this high voltage.

During a read of the memory cell, a high voltage is put on the 'Gate' 15 and the voltage that is stored on the capacitor 13 can be read at the 'Node' 11. The higher the voltage, the faster the read of the memory cell.

During standby, the gate voltage will be driven low to turn off the N-Type transistor 17. Leakage thru this transistor 17 will drain the capacitor. A charge pump can be used to generate this negative voltage to minimize the leakage.

With reference to FIGS. 2-4, in a typical positive charge pump, the positive charge pump will create a new voltage that is higher than the power supply (called VPP). A comparison is usually done to figure out whether the output voltage is high enough. The compare is usually made between some reference voltage and a divided down output voltage.

If the output voltage is too low, the pump can be activated. Looking now at FIG. 2, we see P-type 19 and N-type 21 transistors which act as digital switches in FIGS. 3 and 4. A shorted connection refers to the transistor switch being closed while an open connection refers to the transistor switch being open. There are two phases of operation of the charge pump, which are charging and pumping. During charging shown in FIG. 3, the power supply voltage VDD appears across the capacitor 23. During pumping, the charge built up across the capacitor 23 can be discharged into the output VPP. Together with the comparison and reference voltage these components may make up a charge pump system.

As noted above, voltage generators can be used to create DC voltages that are higher than the input power supply. When the final DC voltage needs to be above two times the power supply, a cascaded design is usually the primary solution. One or more voltage generators may be used to create intermediate voltages, which are then used in the final stage to create the output voltage.

For example, FIGS. 5-8 illustrate a typical two stage prior art voltage generator and its various states. In such, the charge capacitor 25 doubles the power supply (VDD), and then pumps. As a result, the voltage across the capacitor 25 reaches VDouble.

SUMMARY OF THE INVENTION

In view of the foregoing background, it is an object of the invention to provide reliable performance with minimal overhead for a system to improve a multistage charge pump voltage generator.

This and other objects, features, and advantages in accordance with the invention are provided by a system to improve a multistage charge pump that may include a capacitor, a first plate carried by the capacitor, and a second plate carried by the capacitor opposite the first plate. The system may also include a clock to control charging and discharging of the capacitor. The system may further include a power supply to provide a power supply voltage across the first plate and the second plate during charging of the capacitor.

The system may also include a voltage line to lift the second plate to an intermediate voltage during discharging of the capacitor. The system may further include an output line connected to the first plate during discharging of the capacitor to provide an output voltage.

The voltage line may deliver the intermediate voltage as greater than the power supply voltage. The voltage line and the output line may ensure that a voltage across the capacitor remains at or below the power supply voltage.

The output line may deliver the output voltage up to three times the power supply voltage. The capacitor, the clock, the voltage line, and the output line may provide a reduced load in comparison to other voltage multipliers.

Another aspect of the invention is a method to improve a multistage charge pump. The method may include controlling charging and discharging of a capacitor with a clock. The method may also include providing a power supply voltage across a first plate and a second plate of the capacitor during charging of the capacitor.

The method may further include lifting the second plate to an intermediate voltage during discharging of the capacitor, and connecting an output line to the first plate during discharging of the capacitor to provide an output voltage. The method may additionally include ensuring that a voltage across the capacitor remains at or below the power supply voltage.

BRIEF DESCRIPTION OF THE DRAWINGS

FIG. 2 is a schematic block diagram of a prior art positive charge pump.

FIG. 3 is a schematic block diagram of the prior art positive charge pump of FIG. 2 charging.

FIG. 4 is a schematic block diagram of the prior art positive charge pump of FIG. 2 pumping.

FIG. 5 is a schematic block diagram of a prior art two stage voltage generator.

FIG. 6 is a more detailed schematic block diagram of the prior art two stage voltage generator of FIG. 5.

FIG. 7 is a schematic block diagram of the prior art two stage voltage generator of FIG. 6 charging.

FIG. 8 is a schematic block diagram of the prior art two stage voltage generator of FIG. 6 pumping.

FIG. 9 is a block diagram of a two stage voltage generator in accordance with the invention.

FIG. 10 is a more detailed schematic block diagram of the two stage voltage generator of FIG. 9.

FIG. 11 is a schematic block diagram of the two stage voltage generator of FIG. 10 charging.

FIG. 12 is a schematic block diagram of the two stage voltage generator of FIG. 10 pumping.

DETAILED DESCRIPTION OF THE PREFERRED EMBODIMENTS

Figure 1:
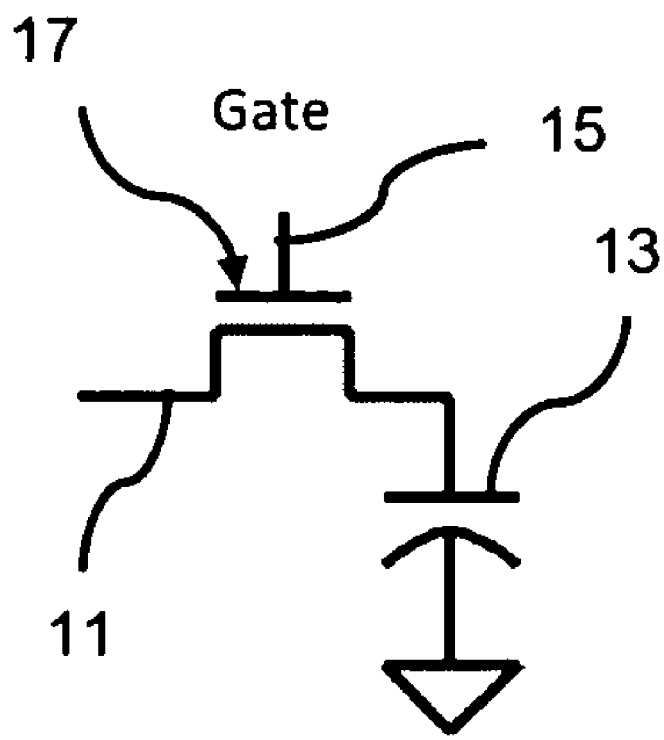
FIG. 1 is a schematic block diagram of a prior art eDRAM charge pump.

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one skilled in the art, the invention may be embodied as a method, system, or computer program product. Furthermore, the invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the invention may be written in an object oriented programming language such as Java, Smalltalk, C++ or the like. However, the computer program code for carrying out operations of the invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIGS. 9-12, a system 10 to improve a multistage charge pump voltage generator is now described. The system 10 includes a capacitor 12, a first plate 14 carried by the capacitor, and a second plate 16 carried by the capacitor opposite the first plate, for example. The system 10 also includes a clock 18 to control charging and discharging of the capacitor 12, for instance. The system 10 further includes a power supply 20 to provide a power supply voltage across the first plate 14 and the second plate 16 during charging of the capacitor, for example.

In one embodiment, the system 10 also includes a voltage line 22 to lift the second plate 16 to an intermediate voltage during discharging of the capacitor 12. In another embodiment, the system 10 further includes an output line 24 connected to the first plate 14 during discharging of the capacitor 12 to provide an output voltage.

In one embodiment, the voltage line 22 delivers the intermediate voltage as greater than the power supply voltage. For example, the intermediate voltage is twice the power supply voltage.

In another embodiment, the voltage line 22 and the output line 24 ensure that a voltage across the capacitor 12 remains below the power supply voltage. As a result, the system 10 improves a multistage charge pump voltage generator by providing reliable performance with minimal overhead. For instance, in modern semiconductor processes where the oxide between the on-chip capacitor plates is very thin, putting more than the power supply voltage across the oxide can cause degradation in performance and/or possibly defects. Further, the load of the system 10 onto the intermediate voltage Vdouble is half the load of the other voltage multipliers, e.g. the prior art two stage voltage generator illustrated in FIGS. 5-8, and therefore system 10 saves area and power.

In one embodiment, the output line 24 delivers the output voltage up to three times the power supply voltage or more. In another embodiment, the capacitor 12, the clock 18, the voltage line 22, and the output line 24 provide a reduced load in comparison to other voltage multipliers, e.g. the prior art two stage voltage generator illustrated in FIGS. 5-8.

Figure 13:
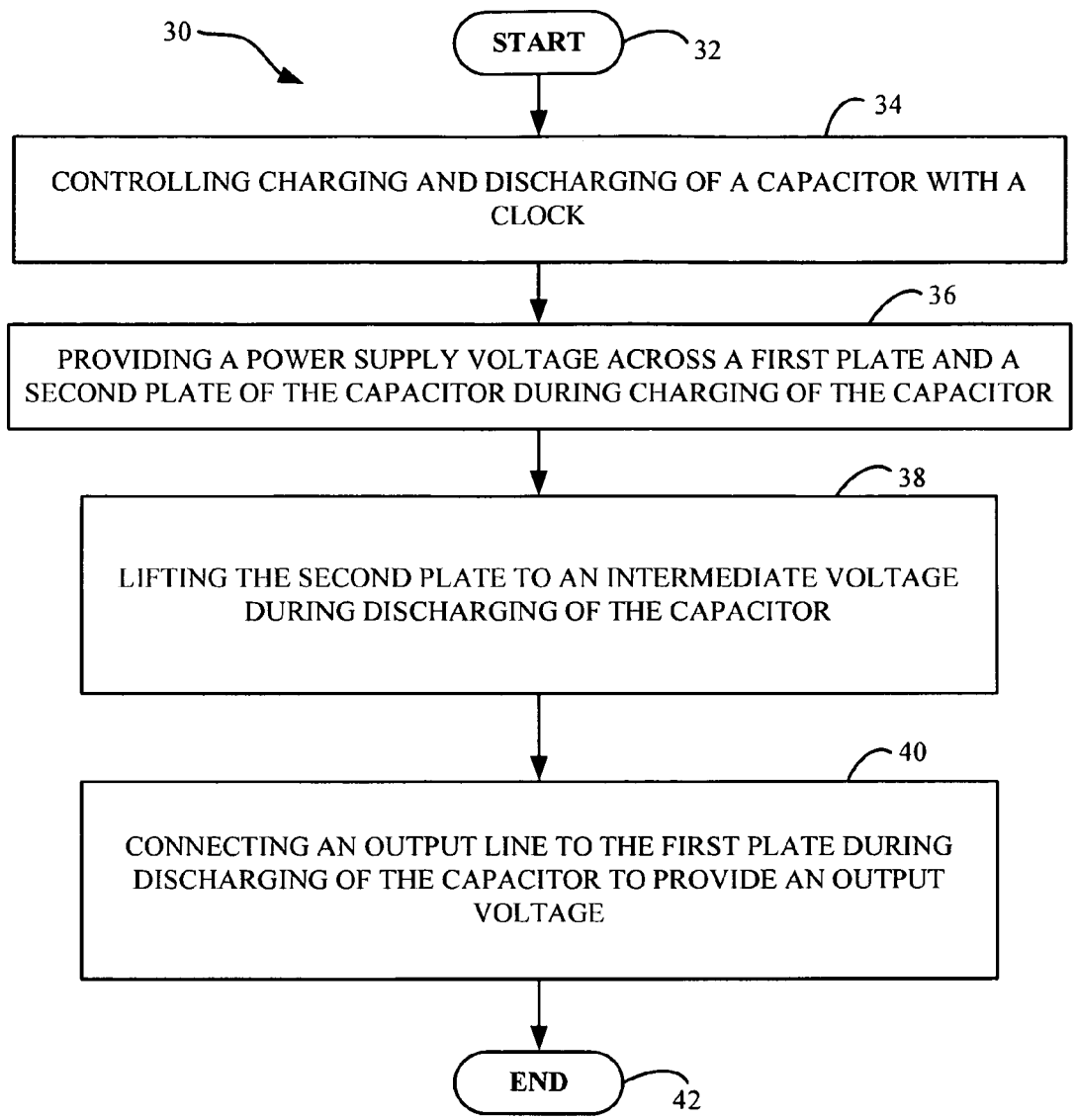
FIG. 13 is a flowchart illustrating method aspects according to the invention.

Another aspect of the invention is a method to improve a multistage charge pump, which is now described with reference to flowchart 30 of FIG. 13. The method begins at Block 32 and may include controlling charging and discharging of a capacitor with a clock at Block 34. The method may also include providing a power supply voltage across a first plate and a second plate of the capacitor during charging of the capacitor at Block 36.

The method may further include lifting the second plate to an intermediate voltage during discharging of the capacitor at Block 38. The method may additionally include connecting an output line to the first plate during discharging of the capacitor to provide an output voltage at Block 40. The method ends at Block 42.

Figure 14:
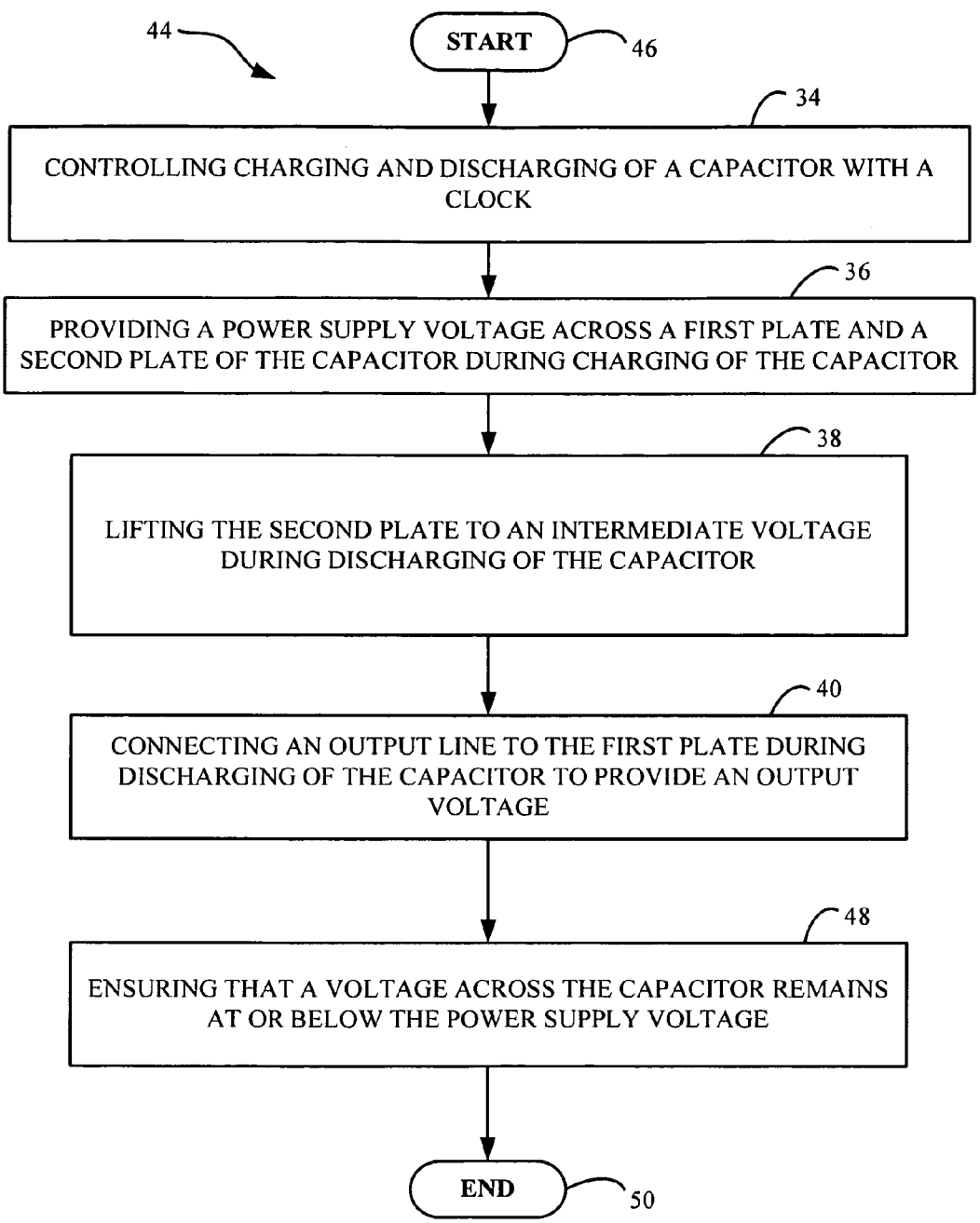
FIG. 14 is a flowchart illustrating method aspects according to the method of FIG. 13.

In another method embodiment, which is now described with reference to flowchart 44 of FIG. 14, the method begins at Block 46. The method may include the steps of FIG. 13 at Blocks 34, 36, 38, and 40. The method may also include ensuring that a voltage across the capacitor remains at or below the power supply voltage at Block 48. The method ends at Block 50.

In view of the foregoing, the system 10 ensures that a voltage across the capacitor 12 is at or below the power supply voltage. The system 10 provides such while delivering reliable performance with minimal overhead.

In contrast, known solutions for creating intermediate voltages used to generate the output voltage in the final stage of a charge pump voltage generator present numerous problems. For example, problems can arise in the final stage due to the fact that the full intermediate voltage is charged across the final capacitor. In modern semiconductor processes where the oxide between the on-chip capacitor plates is very thin, putting more than the power supply voltage across the oxide can cause degradation in performance and/or possibly defects.

Figure 15:
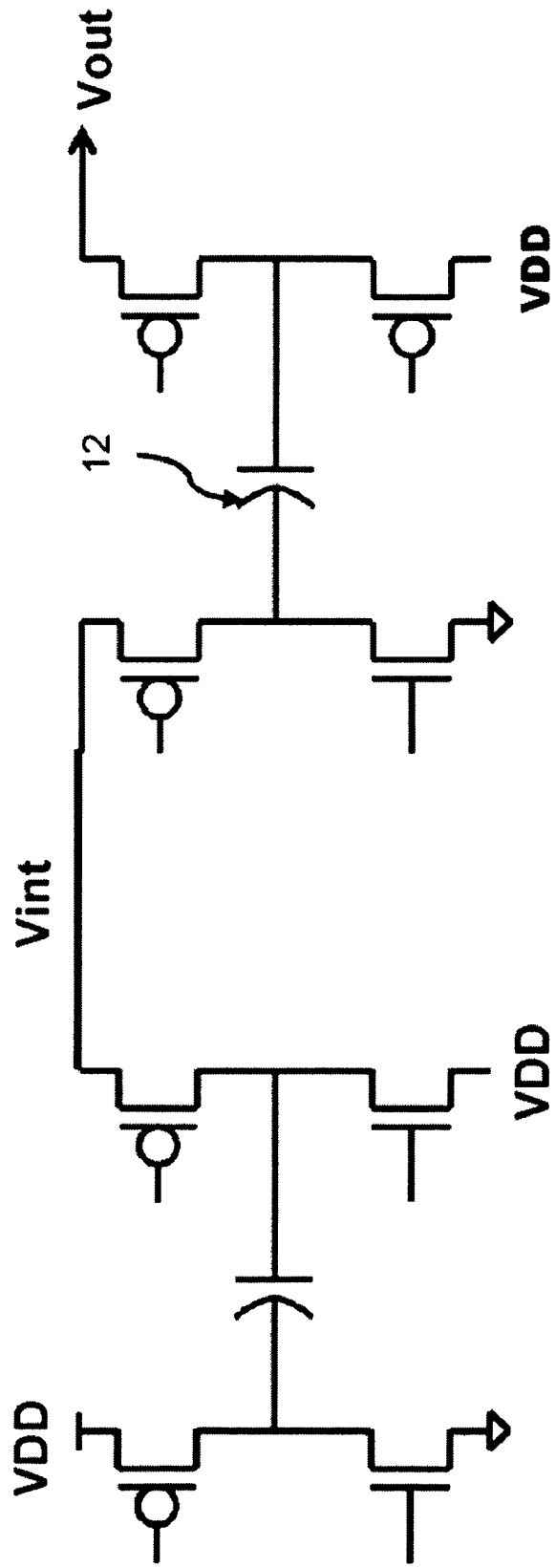
FIG. 15 is a schematic block diagram of an exemplary embodiment of the two stage voltage generator of FIG. 9.

A prophetic example of the system 10 is now described with reference to FIG. 15. In this embodiment, the new circuitry limits the voltage across any one device. In the first stage, an N-channel field-effect transistor acts as a diode to reduce the maximum voltage. In addition, Vint is used in only one place in the second stage. As a result, the total voltage drop across the capacitor 12 is reduced with the added benefits of lower area and power used.

The capabilities of the system 10 can be implemented in software, firmware, hardware or some combination thereof.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention. Furthermore, the use of the terms a, an, etc. do not denote a limitation of quantity, but rather denote the presence of at least one of the referenced item.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

That which is claimed is:

1. A system to improve a multistage charge pump, the system comprising:
    a capacitor having an associated voltage drop across its plates;
    a first plate carried by said capacitor;
    a second plate carried by said capacitor opposite said first plate;
    a clock to control a charging phase and a discharging phase of said capacitor;
    a power supply to provide a power supply voltage across said first plate and said second plate during the charging phase of said capacitor such that the voltage drop across the first plate and the second plate is equal to the power supply voltage;
    a voltage line to lift said second plate to an intermediate voltage during the discharging phase of said capacitor such that the voltage drop across the first plate and the second plate is equal to the intermediate voltage; and
    an output line connected to said first plate during discharging of said capacitor to provide an output voltage.

2. The system of claim 1 wherein said voltage line delivers the intermediate voltage as greater than the power supply voltage.

3. The system of claim 1 wherein said voltage line and said output line ensure that a voltage across the capacitor remains at or below the power supply voltage.

4. The system of claim 1 wherein said output line delivers the output voltage up to three times the power supply voltage.

5. The system of claim 1 wherein said capacitor, said clock, said voltage line, and said output line provide a reduced load in comparison to other voltage multipliers.

6. A method of improving a multistage charge pump, the method comprising:
    controlling charging and discharging of a capacitor with a clock;
    providing a power supply voltage across a first plate and a second plate of the capacitor during charging of the capacitor such that the voltage drop across the first plate and the second plate is equal to the power supply voltage;
    lifting the second plate to an intermediate voltage during discharging of the capacitor such that the voltage drop across the first plate and the second plate is equal to the intermediate voltage; and
    connecting an output line to the first plate during discharging of the capacitor to provide an output voltage.

7. The method of claim 6 wherein the intermediate voltage is greater than the power supply voltage.

8. The method of claim 6 further comprising ensuring that a voltage across the capacitor remains at or below the power supply voltage.

9. The method of claim 6 wherein the output voltage is up to three times the power supply voltage.

10. The method of claim 6 wherein the capacitor, the clock, a voltage line, and the output line provide a reduced load in comparison to other voltage multipliers.

11. A system to improve a multistage charge pump, the system comprising:
    a capacitor having an associated voltage drop across its plates;
    a first plate carried by said capacitor;
    a second plate carried by said capacitor opposite said first plate;
    a clock to control charging and discharging of said capacitor;
    a power supply to provide a power supply voltage across said first plate and said second plate during charging of said capacitor such that the voltage drop across the first plate and the second plate is equal to the power supply voltage;
    a voltage line to lift said second plate to an intermediate voltage that is greater than the power supply voltage during discharging of said capacitor such that the voltage drop across the first plate and the second plate is equal to the intermediate voltage; and an output line connected to said first plate during discharging of said capacitor to provide an output voltage;

wherein said voltage line and said output line ensure that a voltage across the capacitor remains at or below the power supply voltage;

wherein said output line delivers the output voltage up to three times the power supply voltage.

12. The system of claim 11 wherein said capacitor, said clock, said voltage line, and said output line provide a reduced load in comparison to other voltage multipliers.

* * * * *